United States Patent
Elsterer et al.

(10) Patent No.: US 9,106,678 B2
(45) Date of Patent: Aug. 11, 2015

(54) METHOD AND APPARATUS FOR INTERCHANGING DATA BETWEEN TWO DEVICES IN AN AUTOMATION NETWORK

(75) Inventors: Stefan Elsterer, Fürth (DE); Christian Hock, Fürth (DE); Jörn Peschke, Nürnberg (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 122 days.

(21) Appl. No.: 13/699,923

(22) PCT Filed: Apr. 26, 2011

(86) PCT No.: PCT/EP2011/056562
§ 371 (c)(1),
(2), (4) Date: Nov. 26, 2012

(87) PCT Pub. No.: WO2011/147653
PCT Pub. Date: Dec. 1, 2011

(65) Prior Publication Data
US 2013/0070717 A1    Mar. 21, 2013

(30) Foreign Application Priority Data
May 25, 2010   (DE) .......................... 10 2010 021 450

(51) Int. Cl.
*H04L 29/08*   (2006.01)
*H04L 29/06*   (2006.01)

(52) U.S. Cl.
CPC ................ *H04L 67/12* (2013.01); *H04L 69/12* (2013.01); *H04L 69/18* (2013.01)

(58) Field of Classification Search
USPC .......... 370/329, 431, 437, 444; 709/201–203, 709/227, 228
See application file for complete search history.

(56) References Cited

U.S. PATENT DOCUMENTS 6,477,147 B1 * 11/2002 Bocking et al. ............... 370/236
2004/0233927 A1 * 11/2004 Hirosawa ...................... 370/445
(Continued)

FOREIGN PATENT DOCUMENTS

| CN | 1357188 | 7/2002 |
| CN | 101695195 | 4/2010 |
| WO | WO 2007105979 | 9/2007 |

OTHER PUBLICATIONS

Crevatin M. et al., "Security for Industrial Communication System", Proceedings of the IEEE, New York, US vol. 93, No. 6, pp. 1152-1177, XP 011133109, 2005.
Flammini$^a$ et al., "Wired and wireless sensor networks for industrial applications", Microelectronics Journal, Mackintosh Publications Ltd. Luton, GB vol. 40, No. 9, pp. 1322-1338, XP026547128, 2009.
(Continued)

*Primary Examiner* — Edan Orgad
*Assistant Examiner* — Saumit Shah
(74) *Attorney, Agent, or Firm* — Cozen O'Connor (57) ABSTRACT

A method for interchanging data between two devices in a network which utilizes a communication protocol with an interface based on an Object Linking and Embedding for Process Control Unified Architecture (OPC-UA) standard to interchange the data, wherein the communication protocol includes a priority allocation function which can allocate to the data at least two different priority values, and the data are interchanged based on the allocated priority values, such that the data interchangeable between the two devices in a predetermined period of time with a prescribed probability.

7 Claims, 5 Drawing Sheets

(56) References Cited

U.S. PATENT DOCUMENTS

2009/0106345 A1* 4/2009 Landgraf et al. ............. 709/201
2009/0135726 A1* 5/2009 Balan et al. .................. 370/241

OTHER PUBLICATIONS

Ferrari[a] et al., "Performance analysis of profinet networks", Computer Standards and Interfaces, Elsevier Sequoia, Lausanne, C vol. 28, No. 4, pp. 369-385, XP025115571; 2006.

* cited by examiner

FIG 1

-- Prior Art --

FIG. 5

METHOD AND APPARATUS FOR INTERCHANGING DATA BETWEEN TWO DEVICES IN AN AUTOMATION NETWORK

CROSS-REFERENCE TO RELATED APPLICATIONS

This is a U.S. national stage of application No. PCT/EP2011/056562 filed 26 Apr. 2011. Priority is claimed on German Application No. 10 2010 021 450.7 filed 25 May 2010, the content of which is incorporated herein by reference in its entirety.

BACKGROUND OF THE INVENTION

1. Field of the Invention

The invention relates to a method for interchanging data between two devices in a network, where the method uses a communication protocol having an interface conforming to the OPC-UA standard for the purpose of interchanging the data. The invention also relates to an apparatus for interchanging data between two devices as well as to a network having at least two devices and such an apparatus.

2. Description of the Related Art

Crevatin, M. et al., "Security for Industrial Communication Systems", Proceedings of the IEEE, Vol. 93, No. 6, Jun. 1, 2005, pages 1152-1177 ("Crevatin"), describes a method for exchanging data between two devices in a network, where the method communication protocol having an interface conforming to the OPC standard for the purpose of interchanging the data. In dependently thereof, Crevatin mentions the use of IEEE 802.IQ VLAN and priority schemes to enable fast transmission of data with a very low time delay for time-critical applications by bypassing IP layers.

WO 2007/105979 A1 cites, in connection with a synchronization of a software agent with a system cycle in an automation system, an OPC-UA (United Architecture) interface to allow web-based access to parts of an automation system.

Figure 1:
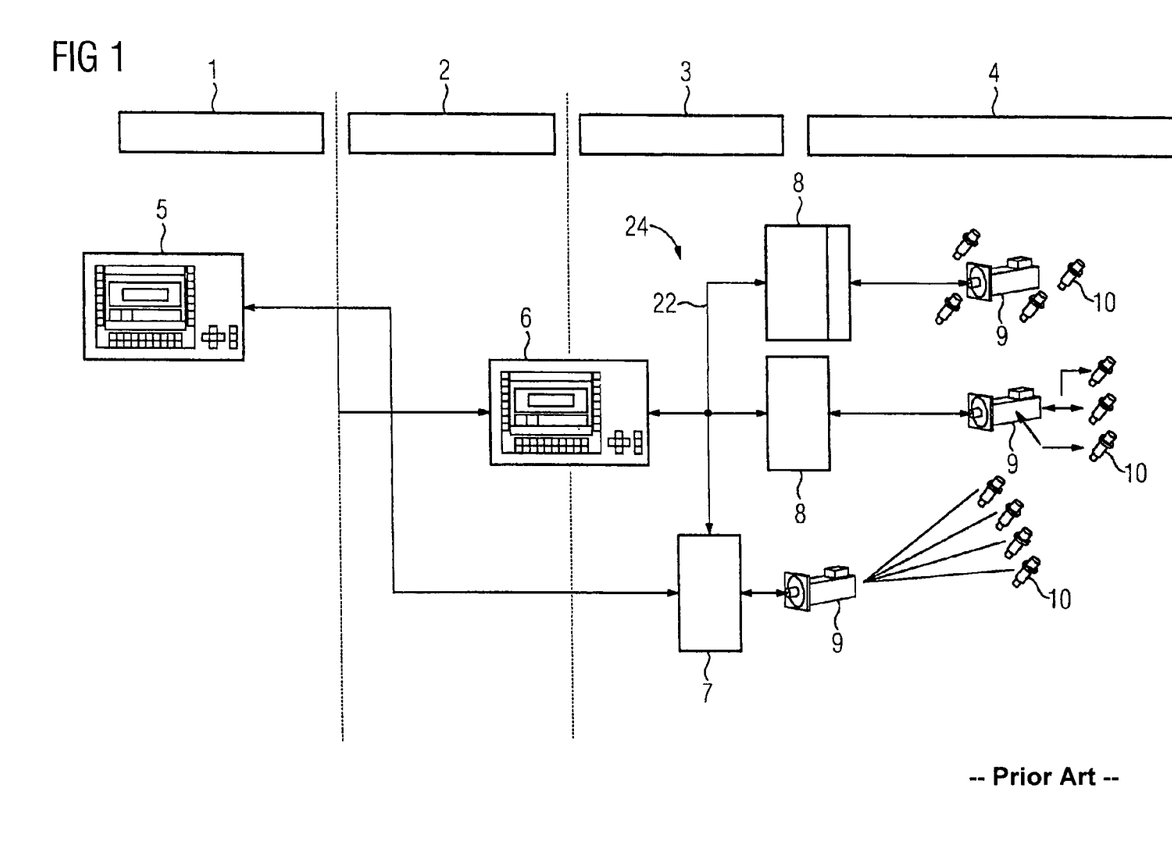
FIG. 1 shows a schematic block diagram of a conventional multilayer network of an automation plant.

FIG. 1 shows a schematic representation of an automation network. A plurality of devices 8 that receive data from sensors 10 and output suitable control data to actuators 9 are located on what is termed the field level of an industrial automation system. Within this scheme the devices 8 can be in operative contact with the sensors 10 and actuators 9 as autonomous computers, or the devices 8 can be embedded systems. In particular, the devices 8 can possess their own individual control firmware. Additionally shown by way of example is a computer 7 that is present at the control level (PLC). The computer 7 and the devices 8 are used for open- or closed-loop control of associated machines of an installation. Within the automation network they reside on the subnetworks of the networks referred to as the field network 4 or plant floor network 3.

A link is formed between the plant floor network 3 and an automation network 2 by way of a computer 6 having a supervisory control and data acquisition (SCADA) system. The computer 6 is thus part of the process control level by which technical processes in the plant floor network 3 and field network 4 are monitored and controlled.

A computer 5 can be provided at a higher hierarchical level of the automation network as part of an enterprise network 1. The computer 5 can contain a manufacturing execution system (MES) and thus be part of the plant control level. Alternatively, the computer 5 can be equipped with an enterprise resource planning (ERP) system as part of the enterprise level, where the ERP system deployed at the office level constitutes a complex software suite for supporting the resource planning of an enterprise (e.g., an SAP system).

It is usual practice to deploy non-realtime-capable star systems for network communication at the office level. The Object Linking and Embedding for Process Control (OPC) Unified Architecture (OPC-UA) system according to the specifications of the OPC Foundation has established itself here as the new standard in network communications between the SCADA system of the computer 6 and the ERP system of the computer 5. In data communication according to OPC-UA, data (values) is assigned a quality that also includes the rate at which the value is to be updated. Only such data is transmitted that has changed and whose attributes initiate the necessity for the respective value to be transmitted. Accordingly, OPC-UA provides event-based communication. In this regard, OPC-UA is based on a remote procedure call (RPC) mechanism, as is known for example in standard Ethernet, TCP/IP (Transmission Control Protocol/Internet Protocol) or also http-based networks. According to the RPC mechanism, a request by a client on a server leads to a procedure being called on the server for the purpose of processing the request. Only when the processing of the request has been completed and a response has been sent from the server to the client, can the server continue the process that was interrupted by the request. This is the classic communications architecture of inter-process communication (IPC) in distributed systems. Concurrently running processes are causally dependent on one another.

OPC-UA, in contrast, knows the mechanism of what are referred to as subscriptions. In this scheme, a receiver takes out a subscription to receive a specific selection of information or data from a sender. If the set of information or selection of data is subsequently changed, the sender will independently send the changes to the receiver. This mechanism can be parameterized, because it can be specified, for example, at what time interval at the earliest changes are to be sent.

With OPC-UA, the industry has available to it a standard protocol with the aid of which it is possible, on the one hand, to model the most disparate forms of information (alarms or process values) in an information model and, on the other hand also, to transport the information. For this purpose there are service sets and services, as they are called, which make the corresponding functionalities available. With OPC-UA, it is possible for the first time to utilize this convenient form of information transmission in the embedded sector also. This makes OPC-UA a powerful tool in the information modeling field.

Whereas OPC-UA is currently used mainly in the automation network 2, for example, in SCADA systems, other requirements entirely are expected to be fulfilled by the communication protocols in the plant floor network 3 and/or field network 4. In the automation environment, it is necessary to synchronize a plurality of devices 8 via communication links. The requirements to be met by the synchronization are very diverse. They extend as far as hard realtime requirements, for example, with respect to the synchronization of drive shafts in a paper mill. In particular on the plant floor, where the field level meets the office level, Ethernet TCP/IP-based infrastructures are often already in use, for example, for communication between head controllers and/or SCADA/MES systems.

In these cases, it is usual to employ what are known as clocked protocols. This means that the time is subdivided into time slices and it is planned precisely in advance which device may send, how and how much, within one timing cycle. Cyclic process maps (tables containing input-output values) are exchanged between the communication partners. The following rule applies here: The shorter the cycle (higher clock rate), the better is the synchronization capability and the more data must be continuously transmitted. A doubling of the clock rate leads to the doubling of the overall communication volume. All the data is always sent in each cycle, irrespective of whether the same time requirements apply to all the values or whether values have changed. This communication principle is usual on the field level in automation technology to ensure that the hard realtime requirements that prevail there can be fulfilled.

In the decentralized peripherals environment, realtime communication can in this case occur, for example, by way of the Profinet IO communication protocol. This enables data interchange between Ethernet-based field devices 8. A further Ethernet-based approach for automation technology is Industrial Real Time Ethernet (IRTE). According to IRTE, communication on the network is preplanned completely to rule out unwanted data collisions. However, this model is very static, because it is unable to respond to changes without new planning. The planning is highly complex and can only be accomplished with the aid of a tool, because time responses due, for example, to cable lengths must also be taken into account. IRTE is primarily used for planning line structures. The advantage consists in strict determinism being established.

As a result, the office and/or control level and the field level are separated in terms of the communication protocols used in their subnetworks. The communication protocols used in each case satisfy different requirements. In certain situations, the realtime requirements prevailing on the field level may be irrelevant to the office level. The expression "vertical integration of automation technology" is understood to mean the aspiration to integrate the different subnetworks and create a standardized communications structure from the enterprise level right down to the field level.

Hard realtime requirements exist in many fields of application of automation technology, for example, when shafts are to be synchronized with a high degree of precision. In hard realtime scenarios, data must be interchanged between two devices within a predefined time period. Communication occurs strictly deterministically. If data is interchanged outside of a specified time interval, the data no longer fulfills the realtime requirements. What is to be understood to mean by realtime is defined in particular in DIN 44300.

In the case of soft realtime requirements, the conditions imposed on the temporal progression of the data interchange are less stringent. It is simply necessary to ensure that the data interchange between two devices is completed within a predetermined time period with a predefined probability. For example, it can be provided that, with regard to a distribution of the time instants at which the data interchange occurs, the average value of the distribution always lies within a predefined time interval. Soft realtime requirements are sufficient in many fields of application of automation technology. This is the case primarily when, owing to the nature of the automation task in hand, the requirements are not so time-critical.

Accordingly, approaches exist for communication protocols that fulfill soft realtime requirements, such as Soft Real Time (SRT) Ethernet. In the case of SRT, Ethernet priority mechanisms are used to make conventional Ethernet and/or TCP/IP communication soft-realtime-capable and thus enable the communication to occur in addition to the conventional data traffic. In the case of SRT, collisions between data packets, although avoided, are not ruled out completely. It is not necessary to preplan communications on the network completely. For example, the time response of the data packets must not necessarily be planned, but only the paths for the prioritized communication. As is usual practice in the case of Ethernet or office communication, star structures can be planned.

SUMMARY OF THE INVENTION

It is an object of the invention to provide a method, an apparatus and a network by which it is possible to achieve an improved integration of subnetworks.

This and other objects and advantages are achieved by providing a method, an apparatus, and a network, where the method in accordance with the invention is used for interchanging data between two devices of a network, and where the method utilities a communication protocol having an interface conforming to the OPC-UA standard for the purpose of interchanging the data. In this case, the communication protocol includes a priority allocation function by which at least two different priority values can be assigned to the data and the data interchange occurs as a function of the assigned priority values, such that the data can be interchanged between the two devices within a predetermined time period with a predefined probability.

OPC-UA (Object Linking and Embedding for Process Control Unified Architecture) is an OPC specification of the OPC Foundation and is described at on the Internet at a website maintained by that organization. The priority allocation function can be particularly implemented as a Soft Real Time extension in the communication protocol. In particular, it can be provided that the application protocol of OPC-UA is not changed, while the protocol layer of OPC-UA is modified by the Soft Real Time extensions. In particular, the priority allocation function can assign priority values to the data such that in the event of a collision of data on the network, in a switch or router, for example, it is specified by way of the priority values which data will be forwarded preferentially. In an embodiment, specific high-priority values are allocated to such data, the interchange of which is intended to satisfy soft realtime requirements. Such data can then be interchanged between two devices within a predetermined time period with a predefined probability. The priority allocation function can be embodied in particular in accordance with a Soft Real Time application known from the prior art. In another embodiment, TCP/IP packets are modified in accordance with suitable Soft Real Time extensions.

With the Soft Real Time approach, realtime requirements can be fulfilled within a certain framework without the need, for example, to marshal the corresponding resources required for an IRTE solution. A conventional OPC-UA communication protocol can be trained with only minor changes for deployment in Soft Real Time environments virtually without restricting the conventional TCP/IP environment. Communication between a server in which the communication protocol in accordance with the method of the invention is used and a server that uses the conventional OPC-UA communication protocol can occur via a simple multiprotocol router, without any necessity for special hardware.

The invention is based on the consideration of modifying OPC-UA by Soft Real Time extensions such that the OPC-UA communication, which is in fact not realtime-capable, will henceforth have soft realtime characteristics. Through the combination of an OPC-UA interface and the priority allocation function in a communication protocol, a form of communication is made possible that satisfies soft realtime requirements and meets many of the requirements in automation technology. The thus realized communication protocol can be implemented in a simple and uncomplicated manner in field level devices. Furthermore, problem-free data interchange with OPC-UA-based devices of higher levels, such as the automation network or the enterprise network is ensured. A high degree of compatibility between subnetworks of an automation plant is achieved and the vertical integration substantially improved. The communication protocol is characterized by a high degree of efficiency because superfluous data interchange is reliably avoided, in particular owing to the OPC-UA component. At the same time, the priority allocation function assures the realtime functionality according to Soft Real Time.

Preferably, the priority allocation function assigns a first priority value to a first type of data and a second priority value to a second type of data, where, for a predefinable network structure via which the interchange of the data between the two devices is executed, it is ensured based on the assigned priority values that in the event of a collision between the data of the first type and data of the second type, the data of the second type is transmitted preferentially. By collision is to be understood in particular the simultaneous arrival of data packets at a nodal point of the network, such as a switch or router. In a collision situation, it is in particular not specified deterministically which of the two data packets will be forwarded preferentially by the switch. A collision situation can also be present when a data packet is already being processed by the switch while a second data packet arrives, with the result that the second data packet cannot be processed further immediately, but is interrupted in its onward transport until such time as the first data packet has been completely processed. In such a collision situation, the priority values ensure that the data of the second type is handled preferentially over the data of the first type. It can also be provided in particular that a processing of the data of the first type that has already started will be interrupted if data of the second type arrives, so that the data of the second type will now be processed preferentially and forwarded on the network. In this way, determinism is reestablished at branch points of the network. In particular, the data of the second type can then be such data that must satisfy soft realtime requirements. the realtime-relevant data is then forwarded with a higher priority than other data for which compliance with a transmission time window is less critical.

Preferably, time windows for interchanging data of the second type are specified such that, for a predefinable network structure, a collision probability of two data packets, each of which contains data of the second type exclusively, does not exceed a predefinable threshold value probability. It is particularly preferred in this case if the time windows for interchanging the data of the second type are specified by parameterizing a periodic synchronization clock between the two devices. By preplanning a clock rate, it can be ensured that no two high-priority data packets containing data of the second type converge simultaneously at a switch. In this way, collision situations are reliably avoided. Realtime-capable data interchange is guaranteed.

Preferably, it can be provided that the network structure is embodied such that a network-related collision probability of data packets, each of which contains data of the second type exclusively, does not exceed a predefinable network-related threshold value probability. Preferably, the network structure will then be embodied in that communication links and/or communication nodes are selected such that the network-related collision probability does not exceed the network-related threshold value probability. By intelligent forward planning, it is possible, for example, to configure cable routes within the network and also the positions of nodes (switches and/or routers) such that the probability of a collision of data of the second type is reduced to an absolute minimum. Determinism is ensured to a certain degree as a result of the definition of threshold value probabilities. The risk that collisions will occur can be kept within limits. This very effectively enables fulfillment of the condition that the data must be interchanged between the two devices within a predetermined time period with a predefined probability.

It is also an object of the invention to provide an apparatus that is used for interchanging data between two devices of a network, where the apparatus utilizes a communication protocol having an interface conforming to the OPC-UA standard for the purpose of interchanging the data. In this case, the communication protocol has a priority allocation function by which at least two different priority values can be assigned to the data. The communication protocol guarantees that the data interchange occurs as a function of the assigned priority values, with the result that the data can be interchanged between the two devices within a predetermined time period with a predefined probability.

A network in accordance with the invention comprises at least two devices as well as an apparatus in accordance with the invention.

The preferred embodiments illustrated with reference to the method in accordance with the inventions and their advantages apply analogously to the apparatus and network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to exemplary embodiments taken in conjunction with the accompanying figures, in which.

DETAILED DESCRIPTION OF THE PREFERRED EMBODIMENTS

Identical or functionally identical elements are labeled with the same reference signs in the figures.

The invention permits OPC-UA to be used in the field of realtime communication (deterministic communication). OPC-UA, which was previously employed mainly in the automation network 2 (for example, in the computer 6 containing the SCADA system), can now make inroads into the plant floor network 3 and/or field network 4. Within the automation pyramid, the application range of OPC-UA is extended downward in the pyramid through use of the method in accordance with the invention. Efforts are being made to deploy OPC-UA further still up to the computer 5 containing the ERP and/or MES system in the enterprise network 1. Consequently, what is achieved as a result is end-to-end communication and a unified view onto the process data from the lowest level right up to the ERP level. The same technology is employed throughout, thus ensuring complete interoperability without the necessity for additional hardware (mappers or converters).

A strength of OPC-UA is its power in information modeling, which is simultaneously used to improve or enable the interoperability of components. All the devices 8 involved provide not only their process values, but in addition also semantic information concerning these values in the information model. This advantage now extends its effect—without additional overhead—right into the plant floor network 3.

Figure 2A:
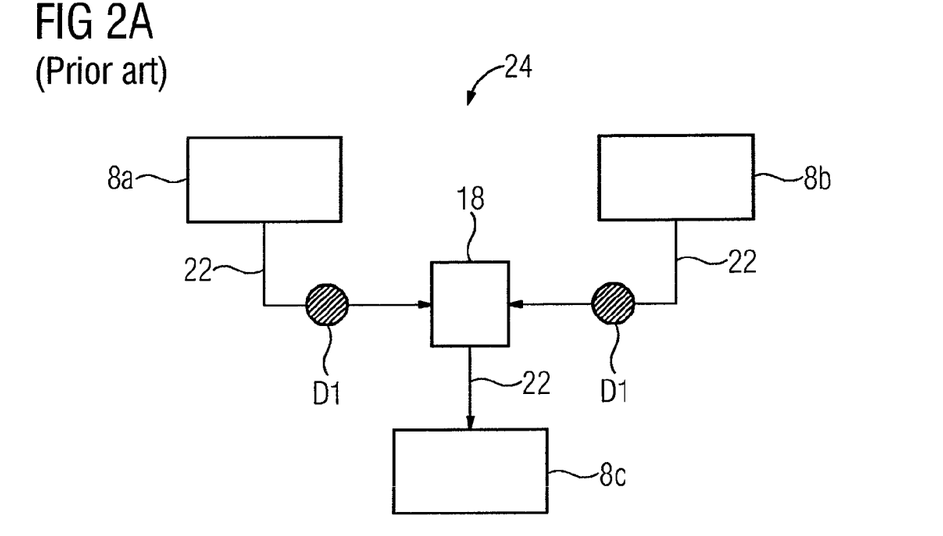
FIG. 2A shows a schematic block diagram of the data interchange between two devices, where a collision situation occurs between sent data packets in accordance with the invention.

FIG. 2A schematically illustrates the communication of a device 8a with a device 8c and the communication of the device 8b with a device 8c. For this purpose, the devices 8a and 8b send data packets D1 over data lines 22 to the device 8c. In this scheme, the network 24 has a node in the form of a switch 18, via which the data packets D1 must run to reach the device 8c. It is possible that the data packets D1 arrive simultaneously at the switch 18, thus creating a collision situation. The switch 18 must decide which of the data packets D1 is to be forwarded first to the device 8c.

With the conventional IRTE-based communication, determinism is no longer given in the situation shown. If a collision occurs, it is no longer clear which of the data packets D1 is to be forwarded first. In order to prevent this situation, all traffic over the network 24 must be preplanned completely. In the case of IRTE communication, the switch 18 is in this instance embodied as a special IRTE switch having IRTE-specific hardware.

In accordance with an exemplary embodiment of the method of the invention, a priority allocation function provides Soft Real Time functionality. This means that suitable priority values are assigned to data packets D1 and D2. In the exemplary embodiment of FIG. 2B, the data in the data packet D2 is such data as is essential for the synchronization of the devices 8a and 8c. The data must consequently satisfy realtime requirements. Determinism must be established with regard to its transmission on the data line 22. For this reason, the priority allocation function of the communication protocol 11 implemented in the device 8a assigns a high-priority value to the data packet D2.

Figure 2B:
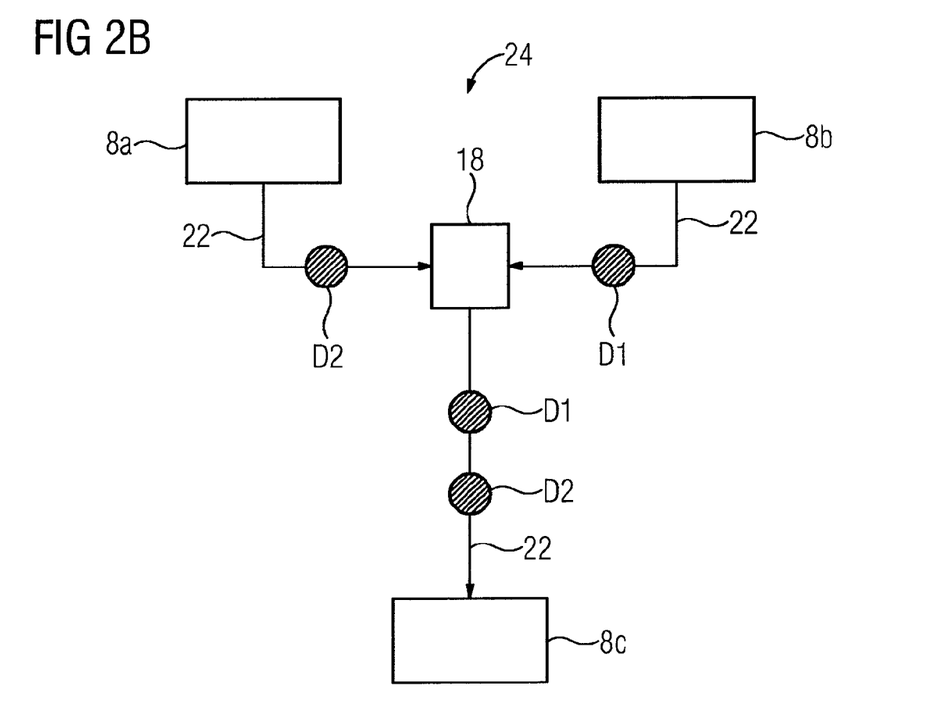
FIG. 2B shows a schematic block diagram of the data interchange between two devices, where a collision situation is avoided through allocation of suitable priority values in accordance with the invention.

The device 8b, in contrast, only needs to transmit to the device 8c data that characterizes an operating condition of the device 8b, for example, its current temperature. The time at which the device 8c receives this information is not especially relevant. For this reason; the priority allocation function provided in the communication protocol 11 of the device 8b assigns a low priority to the data packet D1.

If a collision now occurs between the data packets D1 and D2 containing the priority information at the switch 18, which likewise supports the communication protocol 11 implemented in the devices 8a and 8b, the higher-priority data packet D2 is preferentially forwarded to the device 8c. Determinism is hereby ensured with regard to the data packet D2 and realtime-capable communication between the devices 8a and 8c is achieved.

By means of suitable forward planning, it is merely necessary to ensure that a high-priority data packet D2 is not sent by the device 8b to the device 8c simultaneously with the sending of such a data packet by the device 8a. In practice, this can be achieved statically, i.e., time-independently, by planning communication paths. Practice shows that in most cases the communication paths on which high-priority packets run can be set up disjointly with respect to one another.

In particular, OPC-UA subscriptions can be marked as high-priority data packets D2 by the priority allocation function. Accordingly, it becomes possible through the use of the Soft Real Time approach to send OPC-UA subscriptions (more precisely, the change messages of a subscription) such that they precisely satisfy the Soft Real Time requirements.

Figure 3A:
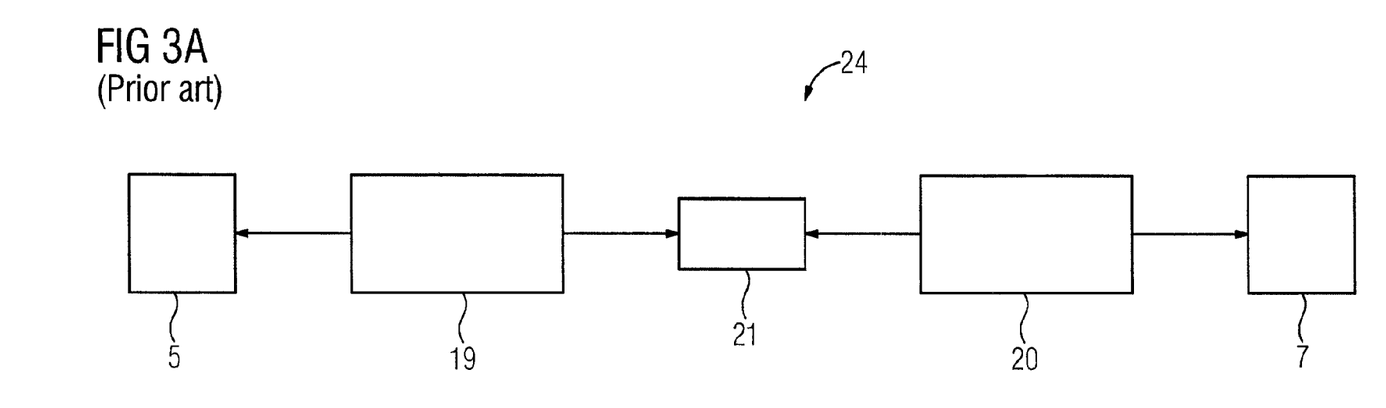
FIG. 3A shows a schematic block diagram of a network infrastructure according to the prior art.

This method improves interoperability on a network structure, as shown in FIG. 1. In accordance with the prior art, a blue box 21 was required in the past to serve as a communication bridge or intermediary between the OPC-UA- or TCP/IP-based office network 19 and the field network 20 based, for example, on Profinet IO. In the schematic representation in FIG. 3A, the bluebox 21 communicates in the direction of the field network 20 by Profinet IO and accordingly is a subscriber in the field network 20. In the direction of the office network 19, the bluebox 21 is able to communicate with an SAP system on the computer 5, for example, via Web Services or OPC-UA. In that case, it is a subscriber in the office network 19.

Figure 3B:
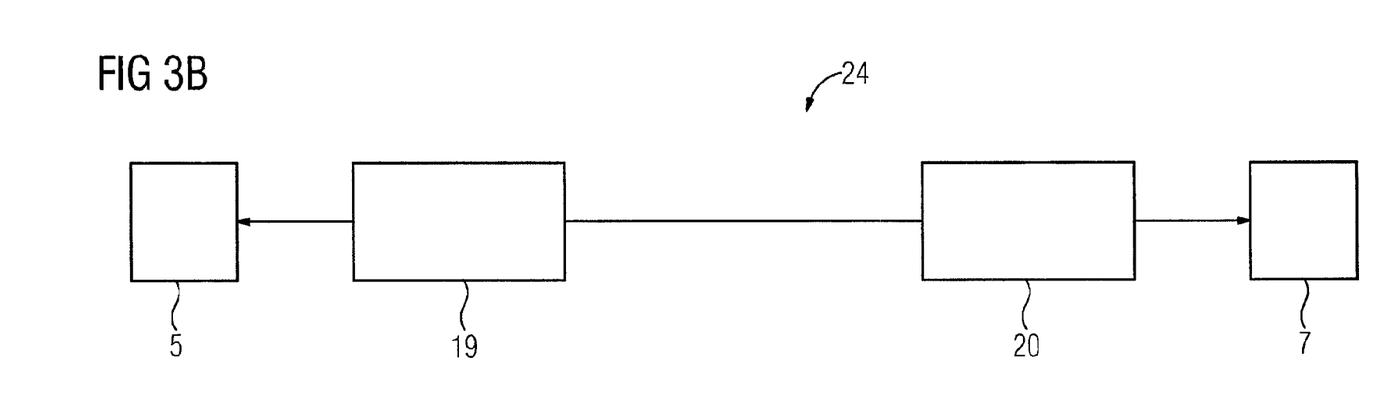
FIG. 3B shows a schematic block diagram network infrastructure in accordance with the invention.

In the method in accordance with the invention having the OPC-UA communication protocol modified by the priority allocation function, the bluebox 21 can be omitted in the network 24, as shown in FIG. 3B. Using the Soft Real Time extension of OPC-UA, a compatible communications environment is created both in the office network 19 and in the field network 20, thereby enabling the bluebox 21 to be dispensed with. Conventional TCP/IP communication and OPC-UA/SRT communication can coexist without mutual interference.

Figure 4:
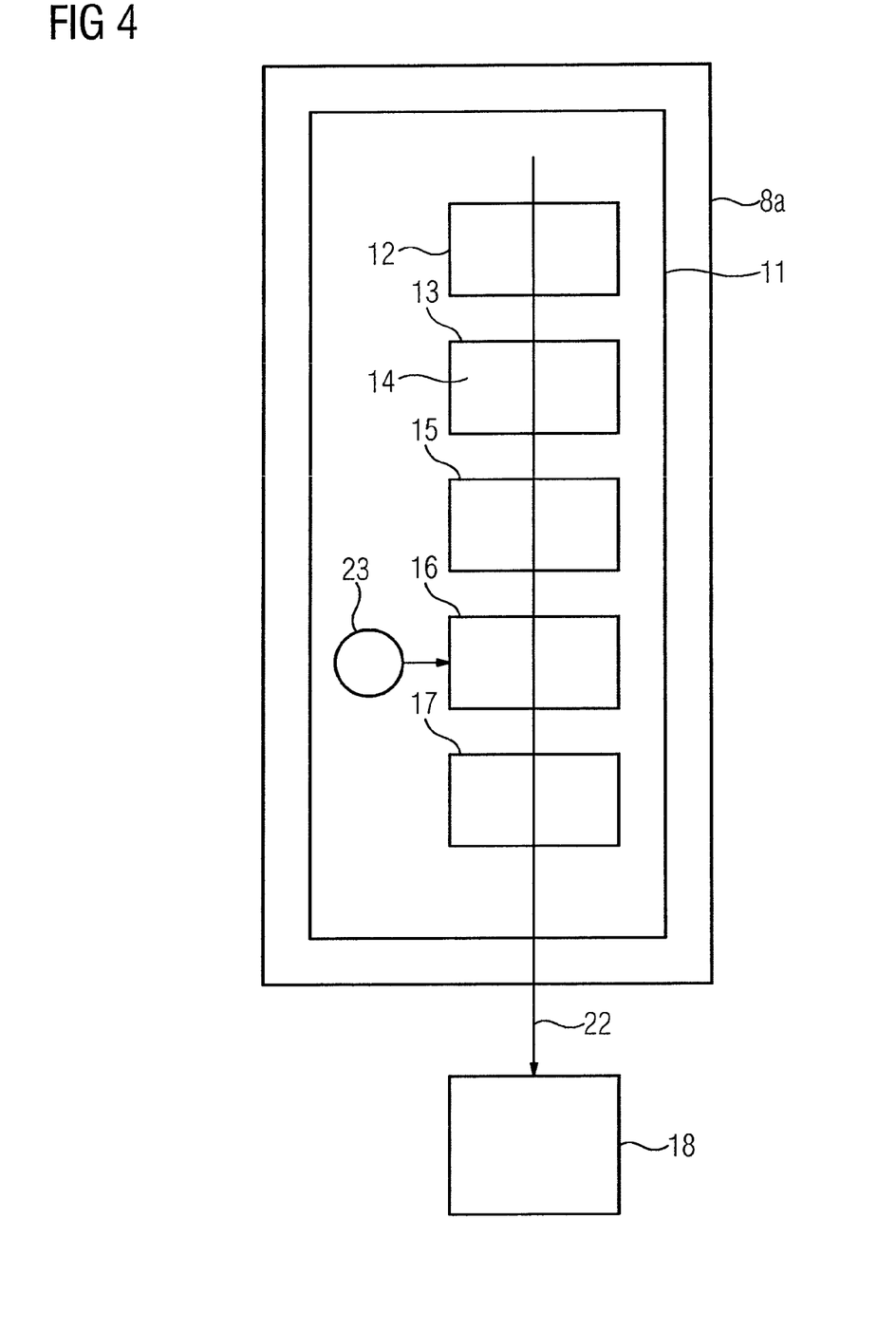
FIG. 4 shows a schematic block diagram of a device which, for the purpose of interchanging data in a network, makes use of a communication protocol according to an exemplary embodiment of the invention method in accordance with the invention.

FIG. 4 provides a further schematic illustration of a possible structure of the communication protocol 11 which is present in the device 8a. The device 8a comprises a computer in which the communication protocol 11 is installed in executable form. In this case, the communication protocol 11 comprises a plurality of layers with associated interfaces. Specifically, these are an application layer 12, a Unified Architecture (UA) stack 14 having an OPC-UA interface 13, a TCP/IP interface 15, an Ethernet interface 16, and a physical interface 17. In addition, a Soft Real Time extension 23 is now provided that implements the priority allocation function. Depending on the type of the data, this is supplemented by the Soft Real Time extension 23 with priority information or a priority value. It is particularly preferred in this case if the communication protocol 11 is implemented as a multilayer structure based on the Open Systems Interconnection reference model (OSI layer model of the International Standards Organization).

Overall, the advantages provided by OPC-UA and SRT are optimally combined within the communications on the network 24. The subscriptions principle used in OPC-UA guarantees that all the relevant data is transmitted, while at the same time the volume of data is low. SRT, on the other hand, guarantees realtime capability to a certain degree. Centralized preplanning of the communication is necessary to a lesser extent than according to the prior art. There is nonetheless an increase in the total volume of data that can be transmitted.

Data for deterministic and non-deterministic communication can be processed very efficiently by the communication protocol. In addition a high level of interoperability on the network 24 is ensured.

Figure 5:
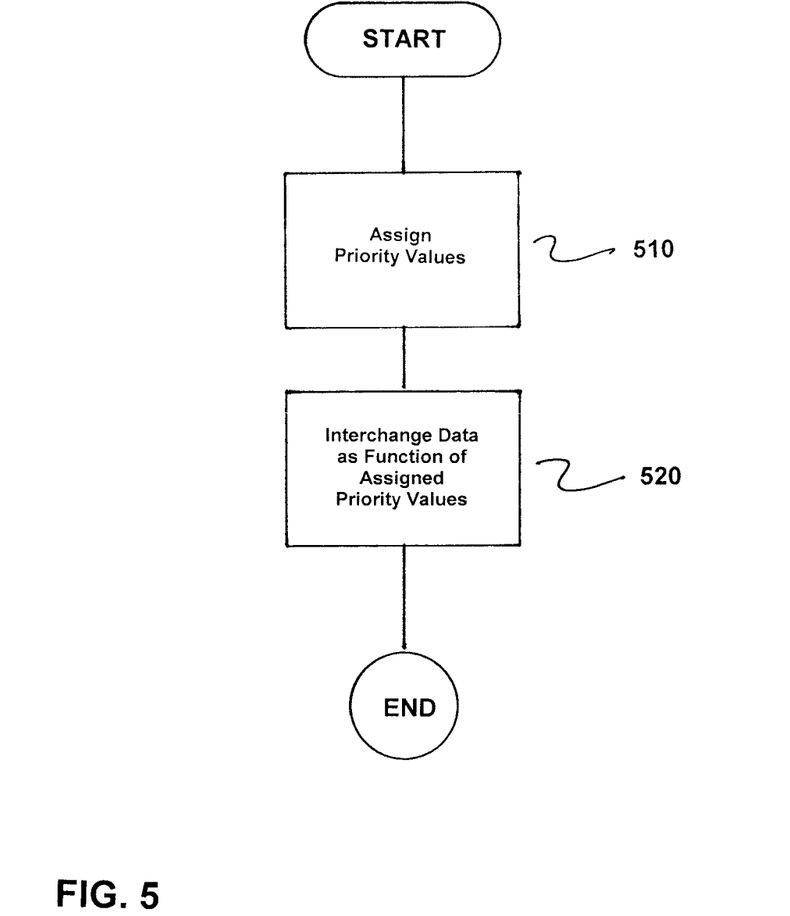
FIG. 5 is a flowchart of the method in accordance with the invention.

FIG. 5 is a flow chart of a method for interchanging data between two devices of a network, where the method utilizes a communication protocol having an interface conforming to an Object Linking and Embedding for Process Control Unified Architecture (OPC-UA) standard to interchange the data. The method comprises assigning at least two different priority values to the data via a priority allocation function of the communication protocol, as indicated in step 510.

The data is then interchanged as a function of the assigned at least two different priority values such that the data is interchangeable between the two devices within a predetermined time period with a predefined probability, as indicated in step 520.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for interchanging data between two devices of a network, said method utilizing a communication protocol having an interface conforming to an Object Linking and Embedding for Process Control Unified Architecture (OPC-UA) standard to interchange the data, the method comprising:
    assigning at least two different priority values to the data via a priority allocation function of the communication protocol; and
    interchanging the data in accordance with the OPC-UA standard as a function of the assigned at least two different priority values such that the data is interchangeable in accordance with the OPC-UA standard between the two devices within a predetermined time period with a predefined probability;
    wherein the priority allocation function assigns a first priority value to a first type of data and a second priority value to a second type of data; and
    wherein, for a predefinable network structure via which the interchange of the data in accordance with the OPC-UA standard between the two devices executes, the data of the second type is transmitted based on the assigned priority values in an event of a collision between the first type of data and the second type of data.

2. The method as claimed in claim 1, wherein time windows for interchanging data of the second type in accordance with the OPC-UA standard are specified such that, for a predefinable network structure, a probability of collision of two data packets, each of which exclusively contains the second type of data, does not exceed a predefinable threshold value probability.

3. The method as claimed in claim 2, wherein the time windows for interchanging the second type of data in accordance with the OPC-UA standard are specified by parameterization of a periodic synchronization clock between the two devices.

4. The method as claimed in claim 1, wherein a structure of the network is configured such that a network-related collision probability of two data packets, each of which contains data of the second type exclusively, does not exceed a predefinable network-related threshold value probability.

5. The method as claimed in claim 4, wherein the structure of the network is configured such that at least one of communication links and communication nodes are selected such that the network-related collision probability does not exceed the predefinable network-related threshold value probability.

6. An apparatus for interchanging data between two devices of a network, said apparatus utilizing a communication protocol having an interface conforming to an Object Linking and Embedding for Process Control Unified Architecture (OPC-UA) standard to interchange the data;
    wherein the communication protocol includes a priority allocation function by which at least two different priority values are assignable to the data;
    wherein the communication protocol ensures that the interchange of the data occurs in accordance with the OPC-UA standard as a function of assigned priority values such that the data is interchanged in accordance with the OPC-UA standard between the two devices within a predetermined time period with a predefined probability;
    wherein the priority allocation function assigns a first priority value to a first type of data and a second priority value to a second type of data; and
    wherein, for a predefinable network structure via which the interchange of the data in accordance with the OPC-UA standard between the two devices executes, the data of the second type is transmitted based on the assigned priority values in an event of a collision between the first type of data and the second type of data.

7. A network comprising at least two devices having the apparatus as claimed in claim 6.

* * * * *